March 26, 1968 M. J. PARUOLO ETAL 3,374,887
AUTOMATIC INSPECTION MEANS FOR CONTAINERS
Filed March 11, 1966 2 Sheets-Sheet 1

INVENTOR.
JAMES H. McMEEKIN
MILLER J. PARUOLO
BY
Christel + Bean
ATTORNEYS

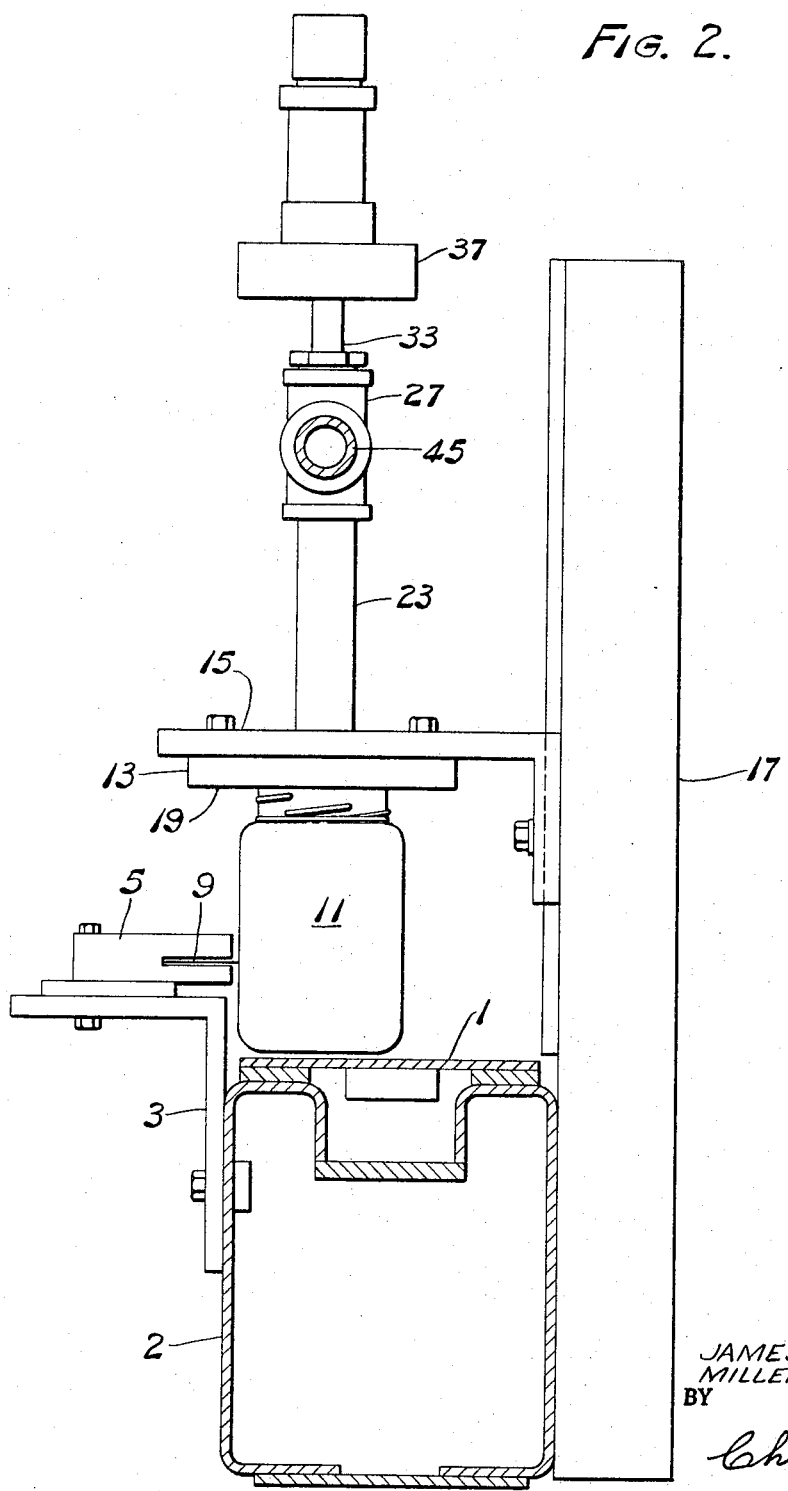

United States Patent Office 3,374,887
Patented Mar. 26, 1968

3,374,887
AUTOMATIC INSPECTION MEANS FOR CONTAINERS
Miller J. Paruolo and James H. McMeekin, Brockway, Pa., assignors to Brockway Glass Company, Inc., Brockway, Pa.
Filed Mar. 11, 1966, Ser. No. 533,521
5 Claims. (Cl. 209—73)

ABSTRACT OF THE DISCLOSURE

An apparatus for automatic inspection of containers that are advanced on a conveyor. The containers contact a switch which triggers a vacuum source. The vacuum source will lift the container against a plate if the flat top of the container does not contain irregularities, cracks, holes or slits and register a maximum pressure difference. A reject mechanism will be activated if the top of the container contains sufficient irregularities to prevent the pressure inside from reaching a predetermined low value.

---

Figure 1:
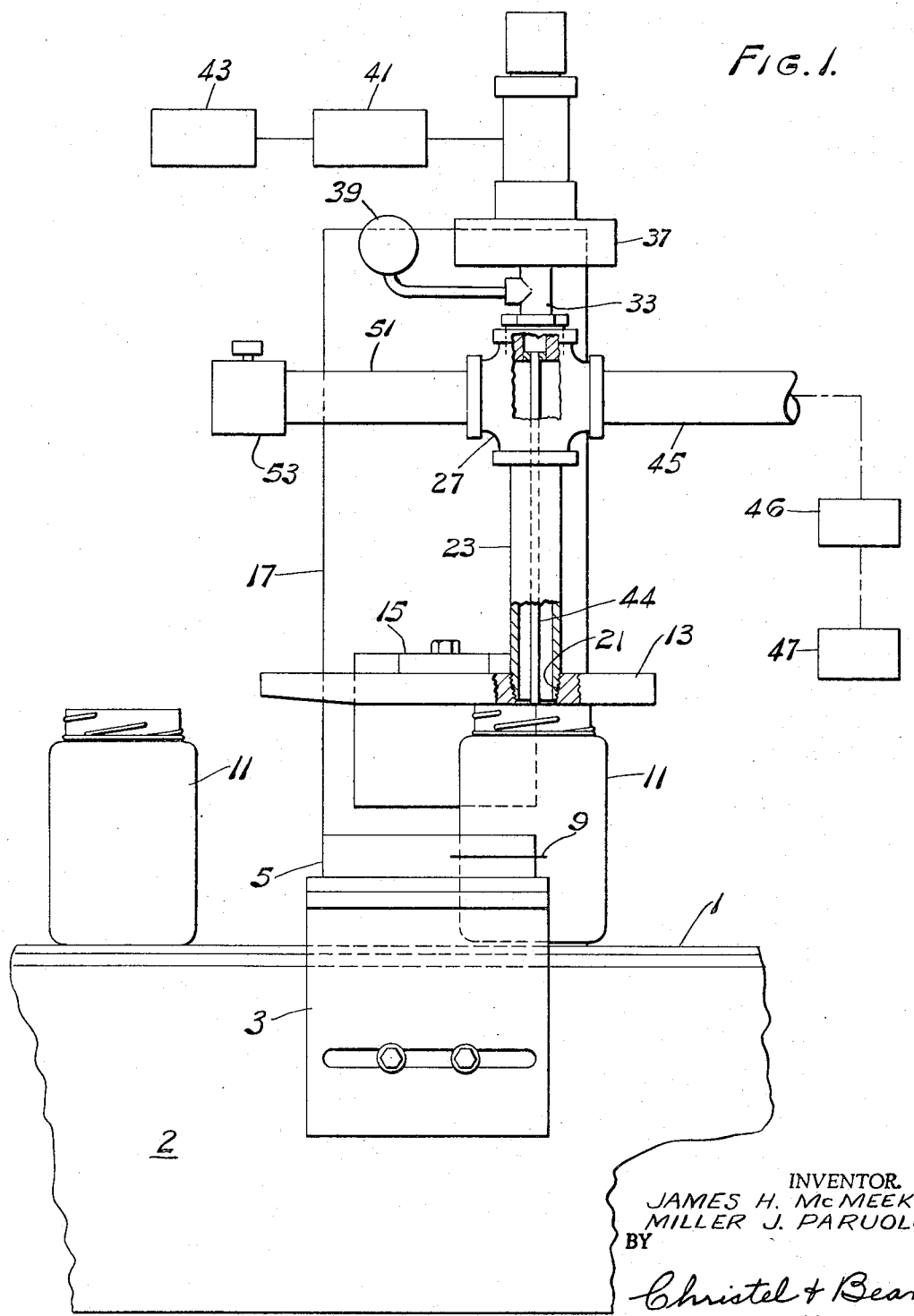

This invention relates to an apparatus for detecting depressions and other irregularities in the top surfaces of open-mouth glass containers and is adapted for use to detect such depressions automatically during the transportation of such containers throughout various stages of manufacture.

It is important that the top surfaces of the finish of glass containers be free of depressions, cracks, warped surfaces and any other defects which render such top surfaces irregular since such irregularities preclude proper filling and sealing of the container. Irregularities in the top surface of the finish pose a multitude of problems when the containers are to be fluid filled and/or vacuum sealed.

In the manufacture of containers, particularly bottles, jars and other glass containers, the top surface of the finish of the containers often does not have the flat planar surface necessary and required for subsequent filling and sealing. Oftentimes the finish is unfilled or dipped. It may also be warped or present alternate convex and concave surfaces known as a saddle finish. Similarly, the finish may have holes or slits therein or the top surface thereof may be perfectly flat but canted. Moreover, a bottle may have cracked or fallen during its conveyance through the manufacturing process or a new bottle may have been produced which is not of the required length.

The above-mentioned defects, heretofore, were not easily detected during the various stages of manufacture of the bottle nor during the finishing and filling thereof and thus it has been impossible to provide bottles which are sufficiently free of defects in their filling and sealing surfaces. Manual inspection, including inspection by visual observation, is obviously time-consuming and is not entirely satisfactory.

It is therefore an object of the present invention to provide an apparatus which detects defects of the above-described nature in a manner which is efficient, inexpensive, and requires a minimum of physical contact with the container itself.

It is a further object of the present invention to provide an apparatus for detecting irregularities in the finish portion of a bottle or jar which may be placed conveniently at any stage of the manufacturing process after the bottle has been initially formed.

Another object of the present invention is to provide an apparatus having a pressure transducer for measuring the difference in pressure within a sealed partially evacuated bottle and atmospheric pressure. The magnitude of this pressure difference gives an immediate indication of the effectiveness of the top sealing surface of the container.

It is still a further object of the present invention to provide a vacuum inducing means communicating with an opening in a flat plate spaced above a container carrying conveyor belt over the top surface of the finish of the containers which induces a partial vacuum within the container, lifts the container from the conveyor belt to a position of abutment with the plate, and makes a pressure measurement to determine pressure leakage, if any, at the abutment of the container with the plate.

These and other objects of the invention will become apparent from the following detailed description, appended claims and drawings which show a representative embodiment of apparatus for accomplishing the purposes of the present invention.

In the drawings:

FIG. 1 is an elevational view partly in cross section showing the detection apparatus disposed over a bottle carrying conveyor; and FIG. 2 is an end elevational view partly in cross section showing the apparatus, the conveyor system and the triggering means for the detection apparatus.

With reference to the drawings and in particular to FIG. 1, the reference numeral 1 denotes a conventional horizontal conveyor belt supported on a base 2 having an upwardly extending bracket 3 which supports a switch 5 at one side of the conveyor. Switch 5 has an operating member 9 which projects over the top of the conveyor belt 2 and is adapted to be engaged by containers or glass bottles 11 carried by the conveyor. Contact with containers 11 as the latter move into inspection position closes the switch 9 completing a circuit which actuates a vacuum system hereinafter described.

Positioned directly above the conveyor system, and spaced therefrom, is a horizontally extending plate 13. Plate 13 is supported by a bracket 15 which is adjustably secured to an upright support 17, the latter being secured to base 2. The height of bracket 15 and consequently plate 13 relative to conveyor belt 1 may therefore by varied to accommodate containers of various heights. Plate 13 has a flat bottom surface 19, the horizontal extent of which is sufficient to cover the breadth of the top surface of the finish of the general run of open-mouth containers. When plate 13 is disposed directly over an open-mouth container the flat bottom surface 19 is designed to form an air-tight seal with the corresponding flat top surface of an open-mouth container. A threaded opening 21 extends through plate 13 for connection with the lower end of a tubular member 23. The upper end of tubular member 23 threads into the bottom of a pipe fitting cross 27.

A second tubular member 33 is secured to the upper outlet of cross 27 opposite tubular member 23 and comprises a T having a pressure transducer 37 mounted at its supper end and a pressure gauge 39 at its lateral outlet. Transducer 37 and pressure gauge 39 measure the pressure difference between atmospheric pressure and the pressure within the containers. Pressure tranducer 37 produces an electrical signal that is electrically connected to an amplifier-demodulator unit 41. Amplifier-demodulator unit 41 electrically connects with a solenoid 43 for actuating conventional rejection means (not shown) such as the means shown in Miles et al. Patent No. 2,902,151 at 102 and 103 in FIGS. 3, 5 and 6. Pressure within a container is transmitted to transducer 37 by a sampling tube 44. Tube 44 extends downwardly from tubular member 33 through cross 27 and tubular member 23 and terminates at the lower end of member 23 flush with bottom surface 19 of plate member 13.

A pipe 45 is threaded into cross 27 and communicates with a solenoid operated valve 46 which leads to a vacuum source 47. Solenoid valve 46 is electrically connected to switch 5 and operable in response to the actuation of switch 5 by the presence of a container to apply sub-atmospheric pressure through cross 27, tubular member 23, and to the interior of container 11. A pipe 51 is threaded into cross 27 and connects with an adjustable orifice member 53 communicating with the atmosphere. Pipes 45 and 51 and member 23 thus define a vacuum or sub-atmospheric pressure line.

Orifice member 53 permits adjustment of the range and sensitivity of the apparatus. Without the orifice member an appreciable time lapse would result before the full degree of vacuum available at source 47 could be established within the container. By providing a controlled orifice in the vacuum pressure line a partial vacuum is induced and the resulting lower pressure difference is reached within a considerably shorter time period than the pressure difference between atmospheric pressure and a substantially complete vacuum. The magnitude of such reduced pressure difference is of course calibrated so as to be sufficient to indicate irregularities in the container. Thus the time required to establish a stable reduced pressure condition in the container, the transducer 37 and the connecting parts is materially reduced and the time period required for inspection is proportionately shortened. Additionally, the orifice tends to damp out pulsations caused by the vacuum pump and thereby minimizes pulsations at the pressure tranducer and consequent oscillation in the pressure measurement.

The spacing between bottom surface 19 of plate 13 and the top surface of the container is of special significance, since sufficient vacuum must be supplied to the lower end of member 23 to lift a container from the conveyor belt into abutting engagement with plate 13. The spacing must be sufficient to clear the containers as they are conveyed toward the inspection position prior to triggering the vacuum source by switch 5 but must be close enough to develop sufficient lifting force to lift successive containers from the conveyor belt.

A spacing between the bottom of plate 13 and the top surfaces of the containers on the order of 1/16 of an inch has been found satisfactory with containers of average size.

In operation, as the containers are advanced to the inspection station on the conveyor belt until each in turn contacts operating member 9, thereby actuating switch 5 and completing a circuit triggering the vacuum source. Member 9 is positioned so that the vacuum source operates only when a container is directly beneath plate 13 with the open mouth of the container in registry with tubular member 23. When the vacuum source is triggered a container is lifted from the conveyor belt into abutting relation with bottom surface 19 of plate 13. Such abutment forms a seal therebetween and pressure transducer 37 measures the pressure difference between atmospheric pressure and the pressure within the container. When the desired measurement is made, the vacuum source is rendered inoperative and atmospheric pressure is introduced into the vacuum pressure line causing the container to drop to the conveyor belt. A suitable time-delay valve may be inserted in the vacuum line for this purpose.

The magnitude of the pressure difference is directly proportional to the effectiveness of the seal between surface 19 and the top surface of the container. A container having a perfectly flat top surface with no cracks, holes, slits, etc. as hereinbefore discussed, and hence forming an effective seal with surface 19 causes the pressure transducer to measure a maximum pressure difference. However, a container having defects at the upper surface will leak and cause the pressure transducer to indicate a smaller pressure difference. If the magnitude of the pressure difference is below a preset standard the container will be rejected, either manually or by automatic means noted above.

The apparatus also detects the presence of containers which have overturned on the conveyor belt and containers that are below the required height. In either case, the vacuum source fails to lift the container from the conveyor and the pressure transducer measures a pressure difference well below the pre-set standard and accordingly activates the reject mechanism.

What is claimed is:

1. Inspection apparatus for ascertaining irregularities in the upper surfaces of open-mouth glass containers comprising a support for an open-mouth container, a member having a flat under surface closely spaced above an open-mouth container on said support, said member having an opening in said flat under surface and means connecting said opening with a vacuum source for lifting a container into abutting engagement with said flat under surface whereby sub-atmospheric pressure is induced in said container, and means measuring the degree of such sub-atmospheric pressure for determining the effectiveness of the fluid seal between said flat under surface and the upper surface of said container, said support comprising a conveyor, and switch means responsive to the advancement of a container into registry beneath said opening to energize said vacuum source for lifting and evacuating such container.

2. Apparatus according to claim 1 including an adjustable orifice leading to the atmosphere from said vacuum source connecting means for regulating the degree of vacuum applied to said container.

3. Apparatus according to claim 1 including a reject means operable when the degree of sub-atmospheric pressure developed at the container due to a sealing defect is below a predetermined minimum for rejecting faulty containers.

4. Apparatus according to claim 2 including a reject means operable when the degree of sub-atmospheric pressure developed at the container due to a sealing defect is below a predetermined minimum for rejecting faulty containers.

5. Apparatus according to claim 2 wherein said member is a flat plate supported in spaced relation above said conveyor and said measuring means includes a pressure transducer communicating with said vacuum source connection for measuring a pressure differential between a pre-determined reference pressure and the pressure at the container.

References Cited

UNITED STATES PATENTS 2,432,871   12/1947   Fedorchak et al. _____ 73—45.3
2,737,803   3/1956    Doudera et al. _____ 73—37

DAVID SCHONBERG, *Primary Examiner.*

LOUIS R. PRINCE, *Examiner.*

WILLIAM HENRY II, *Assistant Examiner.*